United States Patent [19]

Jackson

[11] 4,032,002
[45] June 28, 1977

[54] SELF-TRAINING IDLER ASSEMBLY
[75] Inventor: Allen S. Jackson, Atlanta, Ga.
[73] Assignee: Clifford G. Hollyfield, Jr., Roswell, Ga. ; a part interest
[22] Filed: Feb. 26, 1976
[21] Appl. No.: 661,726
[52] U.S. Cl. .................................. 198/808; 198/825
[51] Int. Cl.² ......................................... B65G 39/16
[58] Field of Search ............... 198/192 R, 202, 808, 198/825

[56] References Cited

UNITED STATES PATENTS

| | | | |
|---|---|---|---|
| 2,179,186 | 11/1939 | Kendall | 198/202 |
| 2,261,088 | 10/1941 | Kendall | 198/202 |
| 2,919,793 | 1/1960 | Lorig | 198/202 |
| 3,098,558 | 7/1963 | Lo Presti | 198/202 |
| 3,356,206 | 12/1967 | Lantz | 198/192 R |
| 3,362,523 | 1/1968 | Stone | 198/192 R |

FOREIGN PATENTS OR APPLICATIONS 575,526   2/1946   United Kingdom ........... 198/192 R Primary Examiner—John J. Love
Assistant Examiner—Richard K. Thomson
Attorney, Agent, or Firm—Newton, Hopkins & Ormsby

[57] ABSTRACT

A self-centering idler assembly is disclosed for a troughing conveyor belt. The idler assembly comprises a support frame and a gravity influenced pendulum cradle rocking supported on the frame for pivotable movement about a generally horizontal axis. A pair of rollers is rotatably mounted to the pendulum cradle along inclined axes above the horizontal axis. So constructed, bidirectional movements of a troughing conveyor belt supported upon the pair of rollers cause the cradle and inclined rollers to swing and bidirectionally train the belt.

5 Claims, 8 Drawing Figures

SELF-TRAINING IDLER ASSEMBLY

BACKGROUND OF THE INVENTION

This invention relates to self-centering idler assemblies for reversably or bidirectionally training driven troughing conveyor belts.

In many applications conveyor belts are driven upon a train or series of supporting rollers with their center portion located beneath the belt sides. With this configuration materials can be conveyed upon the belt without substantial risk of falling from the sides thereof. Thus, such troughing conveyor belts are typically used, for example, in conveying ore in mining operations.

An ever present problem associated with the use of conveyor belts, and with troughing conveyor belts in particular, is the tendency of the belts to detrain and become misaligned with its supporting bed of rollers. The use of guard rails along their sides has failed to solve this problem due to the fraying thereby occasioned of the belt edges. Such rails also create a need for excessive power necessitated in overcoming intermittent frictional drag momentarily created by encounters of the belt sides with the rails.

In an effort to maintain alignment of troughing belts, mechanisms have been devised, as exemplified by that disclosed in U.S. Pat. No. 3,191,761, for mechanically aligning belt supporting rollers in those localities where the tendencies for the belt to become misaligned are identified in actual operation. This approach to the problem, however, has not proved satisfactory due to the tediousness required in effecting alignment. Furthermore, in many applications troughing belts are driven bidirectionally in which case a previously trained roller assembly will actually act to detrain the belt upon reversals in the direction of belt movement. Thus, each time the direction of belt movement is reversed, the roller assembly must again be mechanically aligned.

To overcome these problems mechanisms have been devised for effecting automatic training of troughing belts as exemplified in those disclosed in U.S. Pat. Nos. 2,983,364 and 3,230,321. Mechanisms of the type disclosed in the former patent, however, are deficient due to the fact that each lateral assembly of rollers is canted in tandem during automatic training. This results in a tendency of the mechanism to overtrain thereby creating wave-like or wobbling movement of the belts as they proceed down the line with successive roller assemblies tending to train the belt back and forth. Automatic training assemblies of the type shown in the latter patent have a principal deficiency in their complexity occasioned by the fact that the wing roller members in each assembly of lateral belt supporting roller sets are individually trained thereby providing a multiplicity of movable parts and pivot points which leads to extensive maintenance and insufficient longevity.

Accordingly, it is a general object of the present invention to provide an improved self-training idler assembly for troughing conveyor belts.

More specifically, it is an object of the present invention to provide a self-training idler assembly for a troughing conveyor belt adapted to be reversibly driven.

Another object of the invention is to provide a self-training idler assembly of relatively simple and economic construction.

Another object of the invention is to provide a self-training idler assembly for a troughing conveyor belt having a minimum of moving parts and minimal maintenance.

Yet another object of the invention is to provide a self-training idler assembly in which a single movement of an assembly of two wing rollers causes mutually convergent training of the roller thereby preventing overtraining of either individual roller.

SUMMARY OF THE INVENTION

In one form of the invention a self-training idler assembly is provided for a troughing conveyor belt. The assembly comprises a frame and a pendulum cradle pivotably supported on the frame for pivotable movement about a generally horizontal axis. A pair of rollers is rotatably mounted to the cradle along two inclined axes above the horizontal axis. So constructed, movements of a troughing conveyor belt supported upon the pair of rollers cause the cradle and inclined rollers to swing in unison and bidirectionally train and the conveyor belt.

In another form of the invention a self-training idler assembly is provided for a troughing conveyor belt adapted to be reversibly driven along a path having path sides elevated above the path center. The self-training idler assembly comprises a frame and integral support means for supporting a pair of rollers along mutually intersecting inclined axes extending upwardly from a pivot axis located beneath the path. Mounting means are further provided for pivotally mounting the integral support means to the frame for limited pivotable movement about the pivot axis. A pair of rollers is rotatably mounted upon the integral support means.

DESCRIPTION OF PREFERRED EMBODIMENTS

Figure 1:
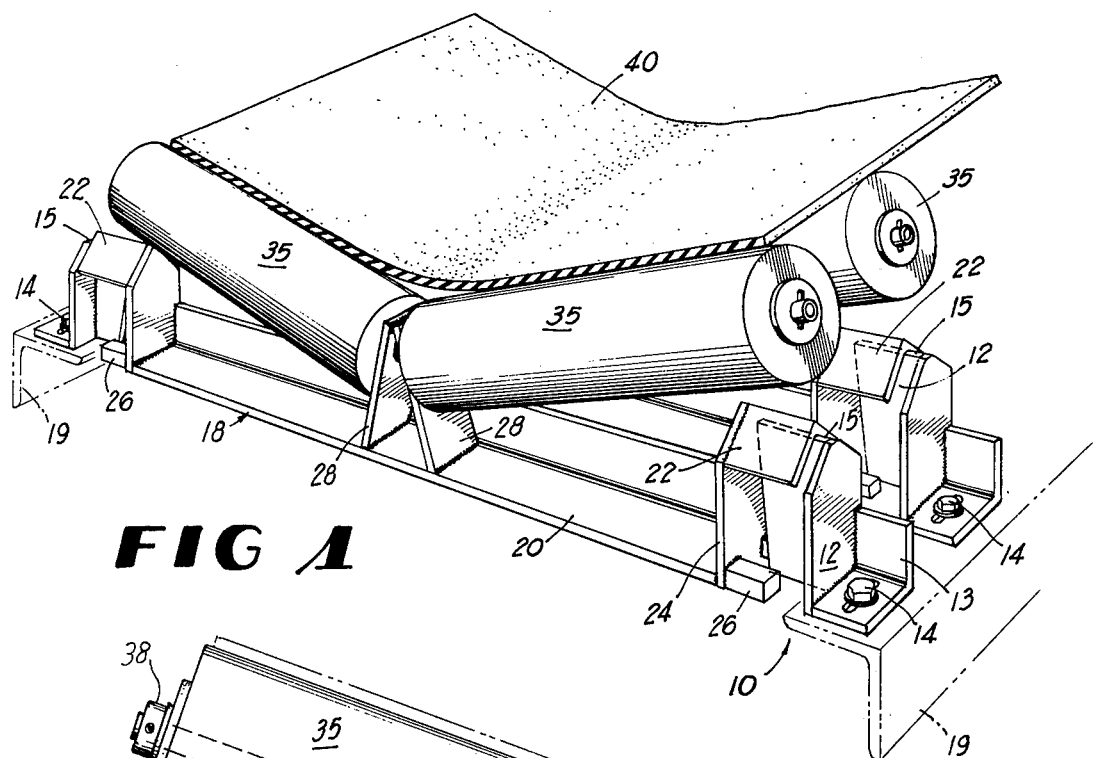
FIG. 1 is a perspective view of a self-training idler assembly embodying principles of the invention shown supporting a troughing conveyor belt.

Referring now in more detail to the drawing, there is shown in FIGS. 1–6 a self-training idler assembly comprising a frame 10 having pairs of laterally spaced upstanding, T-shaped supports 12 welded to pairs of laterally spaced L-shaped brackets or angle irons 13. The brackets are, in turn, adapted to be mounted along the top of parallel frame rails 19 by means of bolts 14. Each pair of laterally spaced upstanding supports has two spaced upper support surfaces 15 positioned substantially horizontally and coplanar.

The idler assembly further comprises a plurality of carriages or pendulumn cradles 18 pivotably supported along the frame 10. Each carriage comprises an angle iron 20 having inverted V-shaped rocker flanges 22 extending outwardly from upright support members 24.

The carriages are pivotably or rockably supported upon the frame with their inverted V-shaped flanges resting atop the upper support surfaces 15. A pair of stops 26 extends laterally outwardly from the upright support members 24 which stops serve to limit rocking or pivotal movement of the carriages upon the frame. Each carriage also has a pair of centrally located struts 28 bonded together as by welding at their tops. A pair of fixed axles 30 is rigidly secured to struts 28 with the axles positioned along mutually intersecting, inclined divergent axes extending upwardly from the struts above angle iron 20. The axles are affixed to the struts at the elevation of the upper support surface 15. Accordingly, rocking movement of the cradle upon the upper support surfaces along a pivot axis 33 causes the fixed axles 30 also to pivot about this same axis along a conical arc. A pair of rubber rollers 35 are rotatably mounted upon axles 30 with washers 36 placed thereabout and a retaining collar 38 secured to the end of the axle distal struts 28.

In operation, a flexible conveyor belt 40 is mounted atop the series of idler assemblies with the center of the belt located beneath the belt sides to form a trough for carrying material thereupon. With the belt at rest upon the rollers the carriages assume the position shown in FIG. 1 with the rollers located directly above the angle iron 20 and the inverted V-shaped supports 22. These supports in turn are set upon the upper support surface 15 of the frame T-shaped supports 12. Once the belt is driven, however, it exerts a force upon the rollers in the direction of belt movement which causes the roller supporting carriages to pivot about pivot axis 33. Pivotal movement of the carriage causes the axles 30 and the rollers supported thereon to move from their positions along common planes above the inverted V-shaped supports 22 as they pivot about axis 33. In doing so rollers in each pair are brought to axes of rotation non-parallel with the direction of belt movement whereupon the directions of rotation of the rollers have convergent components towards the center of the path of belt movement. Thus, rollers 35, when rotated by the belt in the direction of arrows 41, move from axes of rotation 43 to axes of rotation 44. In the event the direction of movement is reversed, the rollers 35 assume axes of rotation 45 which are again convergent in the new direction of movement as indicated by arrows 46. Thus it is apparent that reversible or bidirectional movements of the belt cause the idler assembly automatically to train the belt.

Figures 4, 5, 6:
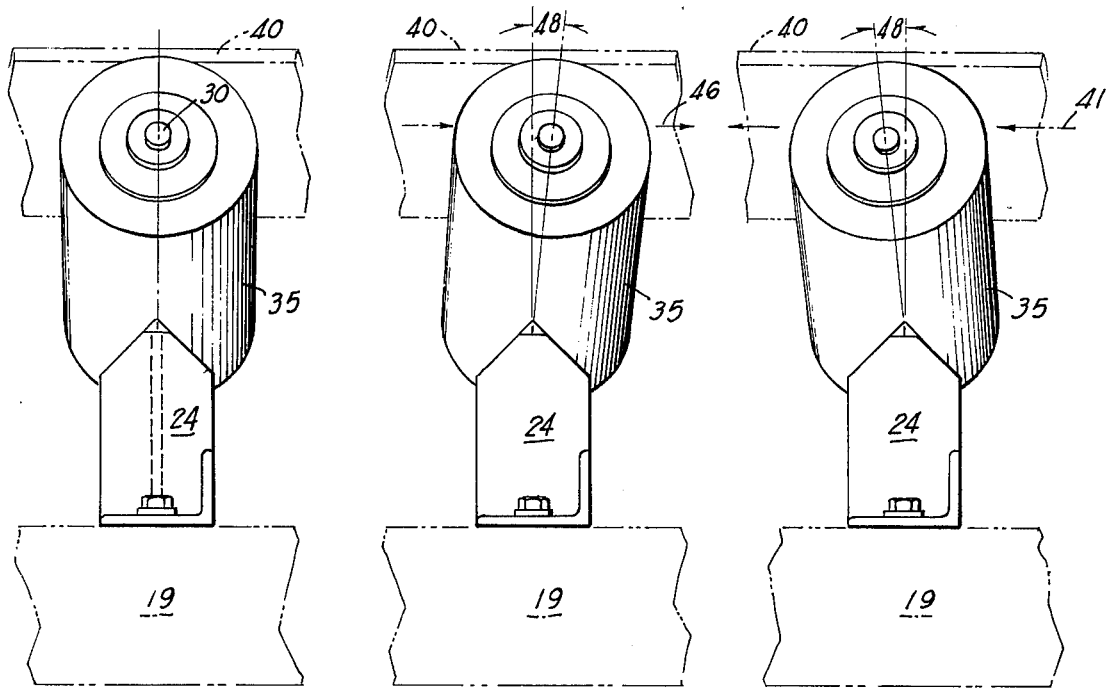
FIGS. 4–6 are side elevational views of the idler assembly shown in FIG. 1 shown in three different operative positions.

In FIGS. 4-6, the just described operation may be visualized from side views. In FIG. 4 a roller 35 is shown in position with the conveyor belt at rest. In FIG. 5 the belt is seen to be driven in a direction of arrows 46 which causes the roller to pivot through an angle 48 convergent towards the center line or trough of the belt. Similarly, as shown in FIG. 6 opposite movement in the direction of arrows 41 causes the belt to move through to a similar angle 48 from its position at rest.

Figure 7:
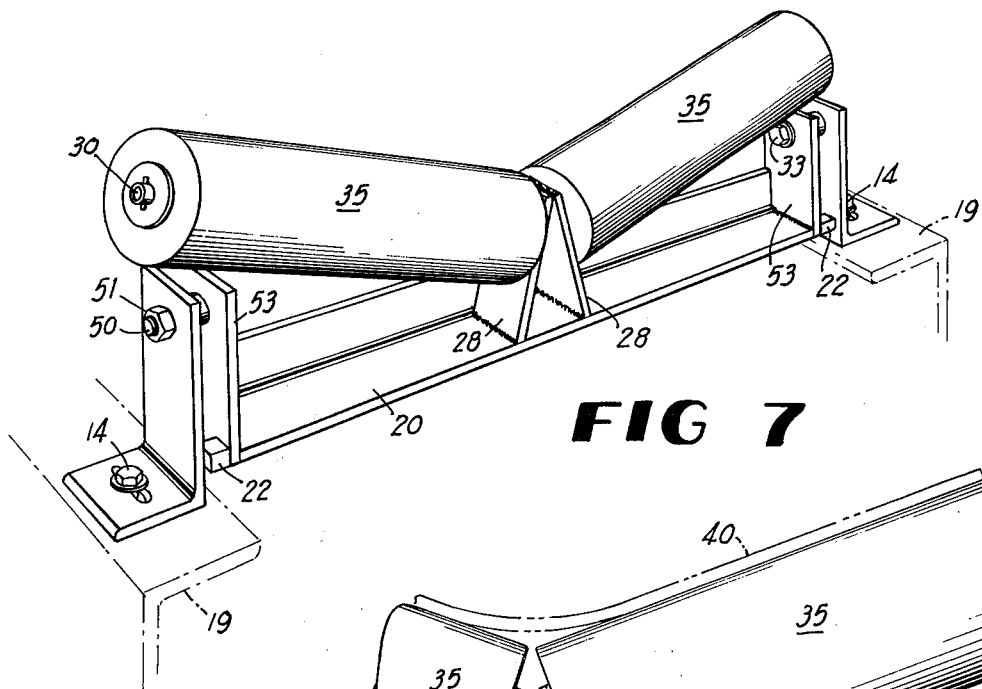
FIG. 7 is a perspective view of a self-training idler assembly embodying principles of the invention in an alternative form.
Figure 8:
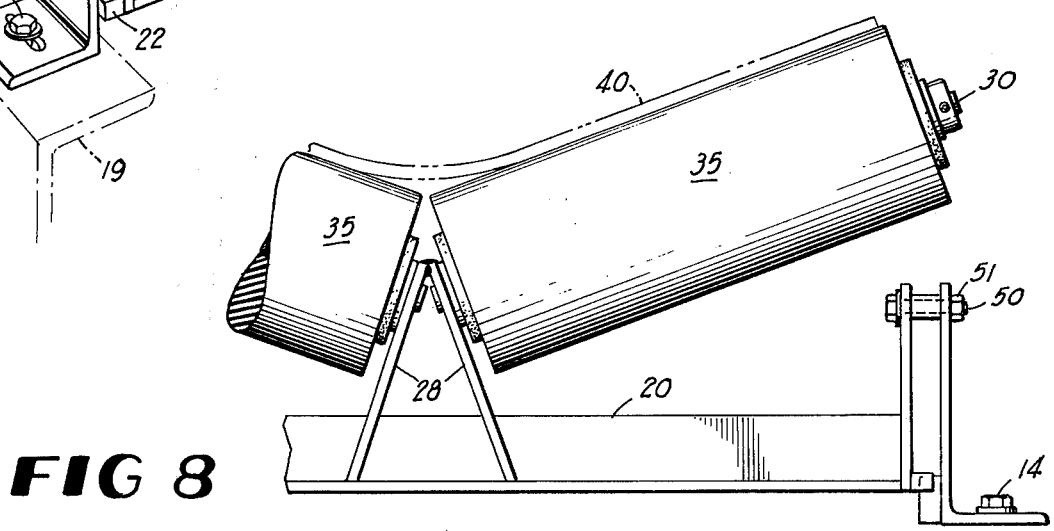
FIG. 8 is a front elevational view of a portion of the idler assembly shown in FIG. 7.

In FIGS. 7 and 8 an idler assembly in an alternative form is shown where again rubber rollers 35 are rotatably mounted above fixed axles 30 rigidly secured to upstanding struts 28 mounted to an angle iron 20 of an assembly carriage. In this case, however, the carriage is pivotably mounted to the frame by means of nuts 51 and bolts 50 which extend through aligned holes in carriage upright supports 53 welded to angle iron 20 and frame brackets 52 secured atop rails 19. Preferably, axles 30 are secured to the carriage to the upstanding supports 28 along pivot axis 33 of the carriage upon the frame. This, however, is not mandatory. Furthermore, one or more intermediate rollers may be provided between the laterally spaced wing rollers 35. Operation is the same as in the previously described embodiment.

Figure 2:
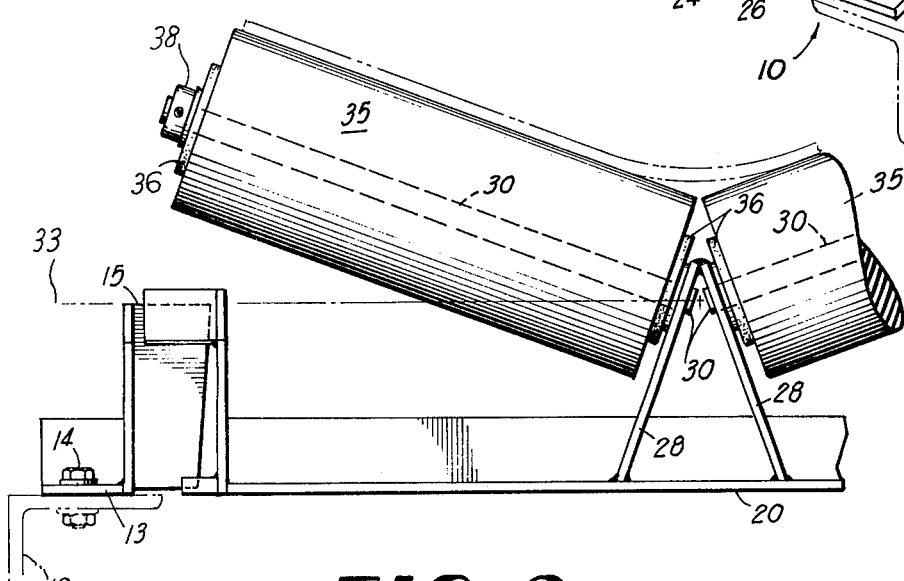
FIG. 2 is a front elevational view of a portion of the idler assembly shown in FIG. 1.
Figure 3:
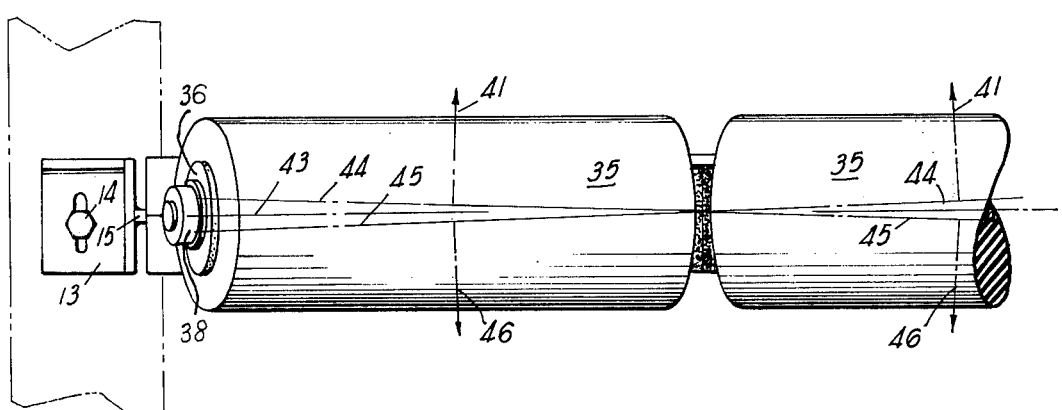
FIG. 3 is a plan view of the portion of the idler assembly shown in FIG. 2.

It may be seen in light of the above description and drawings that in both forms of the invention the pairs of inclined divergent belt training rollers 35 are bodily swingable or rockable on their described pendulum carriages 18, etc. The support base 20 for the rollers 35, FIGS. 2 and 20, is considerably below the swing axis 33 of the pendulum carriages, whereby the carriages and rollers are influenced by gravity to return automatically to neutral positions, such as illustrated in FIG. 4, and thus require no springs or linkages to influence the automatic return. The structure and mode of operation is characterized by great simplicity and takes advantage of gravity.

It should be understood that the just described embodiments merely illustrate principles of the invention in preferred forms. Many modifications, additions and deletions may, of course, be made thereto without departure from the spirit and scope of the invention as set forth in the following claims.

I claim:

1. Mechanism for automatically training a troughed belt in both of its directions of linear travel comprising a support frame, a series of pendulum cradles on the support frame transversely of and beneath the troughed belt, pairs of tranversely inclined divergent axis belt support and training rollers journaled on said pendulum cradles and being swingable bodily with the cradles relative to said support frame, and fulcrum means on said support frame and cradles substantially above the centers of gravity of the cradles from which the cradles and said rollers swing freely and are self-centering under the influence of gravity.

2. Mechanism as defined in claim 1, and coacting stop means for said cradles on the support frame and cradles to limit the pendulum swinging action of the cradles on said fulcrum means.

3. Mechanism as defined in claim 1, and said pairs of rollers being cantilevered on said pendulum cradles, and bearing supports for the inner ends of said rollers on each cradle substantially at the center of each cradle.

4. Mechanism as defined in claim 1, and said fulcrum means for each cradle comprising a pair of fixed upstanding fulcrum members on said support frame adjacent the ends of each cradle, and coacting rocker elements on the opposite ends of each cradle resting on the fixed fulcrum members.

5. Mechanism as defined in claim 1, and said fulcrum means comprising suspension members on the ends of each cradle, fixed upstanding support elements on said support frame adjacent the opposite ends of each cradle, and transverse axis pivot elements carried by said fixed upstanding support elements and swingably supporting said suspension members.

* * * * *